US009365079B2

(12) United States Patent
Nishimura

(10) Patent No.: US 9,365,079 B2
(45) Date of Patent: Jun. 14, 2016

(54) RADIAL TIRE FOR MOTORCYCLE

(71) Applicant: Sumitomo Rubber Industries, Ltd., Kobe-shi, Hyogo (JP)

(72) Inventor: Akihiro Nishimura, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 298 days.

(21) Appl. No.: 14/187,397

(22) Filed: Feb. 24, 2014

(65) Prior Publication Data
US 2014/0251520 A1 Sep. 11, 2014

(30) Foreign Application Priority Data

Mar. 11, 2013 (JP) ................. 2013-048323

(51) Int. Cl.
B60C 9/18 (2006.01)
D02G 3/48 (2006.01)
B60C 9/20 (2006.01)
B60C 9/00 (2006.01)

(52) U.S. Cl.
CPC ............. *B60C 9/2006* (2013.04); *B60C 9/0057* (2013.04); *D02G 3/48* (2013.01); *B60C 2009/0085* (2013.04); *B60C 2009/0092* (2013.04); *B60C 2009/1828* (2013.04); *B60C 2009/208* (2013.04); *B60C 2009/2077* (2013.04); *B60C 2009/2093* (2013.04); *B60C 2200/10* (2013.04)

(58) Field of Classification Search
CPC .... B60C 9/18; B60C 9/2006; B60C 2009/18; B60C 2009/2016; B60C 2009/2048; B60C 2009/2074; B60C 2200/10; D02G 3/48
See application file for complete search history.

(56) References Cited

U.S. PATENT DOCUMENTS 4,268,573 A * 5/1981 Baillievier ............ B60C 9/0007
152/451

FOREIGN PATENT DOCUMENTS

| CA | 1312267 | * | 1/1993 |
| JP | 4-365602 A | | 12/1992 |
| JP | 7-292586 | * | 11/1995 |
| JP | 2008-100552 A | | 5/2008 |
| JP | 2011-168095 | * | 9/2011 |

* cited by examiner

*Primary Examiner* — Justin Fischer
(74) *Attorney, Agent, or Firm* — Birch, Stewart, Kolasch & Birch, LLP

(57) ABSTRACT

A radial tire for motorcycle comprises a tread portion provided with a belt structure composed of two cross plies of 3×3×0.17 steel cords. The steel cord has a bending rigidity of from 10.0 to 12.0 g·cm. The elongation L100 of the steel cord at a tensile load of 100 N is 1.5% to 2.0%.

4 Claims, 3 Drawing Sheets

RADIAL TIRE FOR MOTORCYCLE

BACKGROUND OF THE INVENTION

The present invention relates to a radial tire for motorcycle, more particularly to a cross-ply steel-cord belt structure suitable for a rear tire of a large sized motorcycle.

In the radial tires for four-wheeled vehicles, a cross-ply structure including two cross plies of steel cords is widely employed as a tread reinforcing belt.

In comparison with the tread portion of a pneumatic tire for four-wheeled vehicle, the tread portion of a pneumatic tire for motorcycle is convexly highly curved as a characteristic of a motorcycle tire. As a result, the belt cords are subjected to a larger deformation during running.

Therefore, if the steel belt cords usually employed in the passenger tires are used in a radial tire for motorcycle, due to the compression fatigue of the cord, the strength of the cord is rapidly decreased, and the durability of the tire is decreased. Therefore, an organic fiber cord having resistance to compression fatigue is usually employed in a cross-ply belt structure of a radial tire for motorcycle. In particular, from a point of view of handling stability, there is a tendency that aramid cords are used for example as disclosed in Japanese patent application publication No. JP-A-H04-365602.

Although the aramid cords have high elastic moduli, such moduli are not enough from a point of view of handling stability.

Japanese patent application publication No. JP-A-2008-100552 discloses a radial tire for motorcycle in which, in order to overcome the decrease in the durability due to compression fatigue, a steel cord made of very fine filaments of less than 0.10 mm dia. is used as the belt cord.

Such very fine filaments are however, costly and not readily available. Further, the handling stability is still not reached to satisfactory levels.

SUMMARY OF THE INVENTION

It is therefore, an object of the present invention to provide a radial tire for motorcycle in which a cross-ply belt structure employing a steel cord having a 3×3×0.17 structure whose bending rigidity and elongation are specifically defined is disposed in the tread portion, and excellent handling stability can be obtained without sacrificing ride comfort, formability and durability.

According to the present invention, a radial tire for motorcycle comprises a tread portion curved so that the maximum tire section width lies between the tread edges, and a belt disposed radially outside the carcass in the tread portion, and composed of two cross plies of steel cords, wherein the steel cords in each of the two cross plies are laid at an angle of from 10 to 30 degrees with respect to the tire circumferential direction, the steel cords each have a 3×3×0.17 cord structure in which three strands each made up of three steel filaments having a diameter of 0.17 mm and primary-twisted are final-twisted together, a bending rigidity of each of the steel cords is 10.0 to 12.0 g·cm, and an elongation L100 of each of the steel cords at a tensile load of 100 N is 1.5 to 2.0%.

Preferably, two of the three steel filaments in each strand are preshaped into a wavy form before twisted.

Preferably, each of the three strands has a primary twist number N1, the three strands have a final twist number N2 and the sum (N1+N2) of the primary twist number N1 and the final twist number N2 is at least 9 turns/10 cm.

Thus, the bending rigidity of the belt cord is relatively low, and the elongation L100 of the belt cord is relatively large. As a result, it is possible to provide for the belt cord with a resistance to compression fatigue without using a very fine filament whose diameter is less than 0.1 mm, and thereby the required tire durability can be secured.

In particular, by setting the bending rigidity at 10.0 g·cm or more, the handling stability can be improved.

By setting the bending rigidity at 12.0 g·cm or less, the belt preformed into a cylindrical shape can be transformed into a barrel shape during building the raw tire to accord with the highly curved tread profile. Thus, the formability of the raw belt can be improved.

By setting the elongation L100 of the steel cord at 1.5% or more, ride comfort and the durability of the tire can be secured. By setting the elongation L100 at 2.0% or less, the strength of the tire and handling stability can be secured.

In order to obtain the bending rigidity and elongation L100 within the above-mentioned ranges, it is necessary that the steel cord includes a large number of shaped filaments, and the number of twist is set at high values.

In a 3×3 structure, the number of the filaments is nine and numerous, and the number of twist becomes increased by the primary twist and final twist, therefore, a 3×3 structure is essential in order to obtain the above-mentioned cord properties.

DESCRIPTION OF THE PREFERRED EMBODIMENTS

Embodiments of the present invention will now be described in detail in conjunction with the accompanying drawings.

Figure 1:
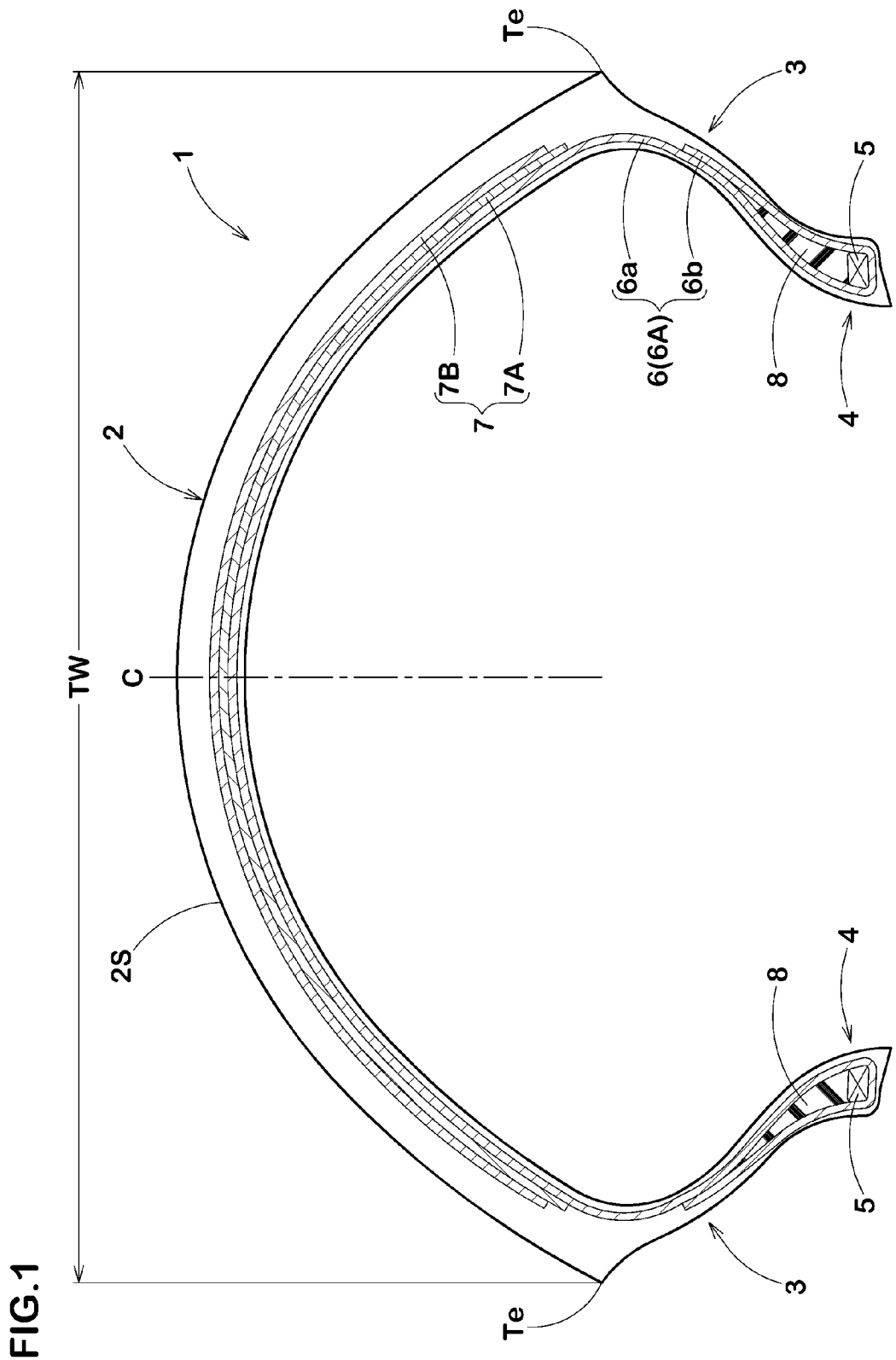
FIG. 1 is a cross sectional view of a radial tire for motorcycle as an embodiment of the present invention.

As shown in FIG. 1, a radial tire 1 for motorcycle as an embodiment of present invention comprises a tread portion 2, a pair of sidewall portions 3, a pair of bead portions 4 each with a bead core 5 embedded therein, a carcass 6 extending between the bead portions 4 through the tread portion 2 and sidewall portions 3, and a belt 7 disposed radially outside the carcass 6 in the tread portion 2.

As a characteristic of a motorcycle tire, the tread portion 2 is convexly curved so that the tread face 2S between the tread edges Te is curved like an arc swelling radially outwardly, and the maximum cross sectional width of the tire 1 occurs between the tread edges Te, namely, equals to the axial tread width TW.

The carcass 6 is composed of one or more plies 6A, in this example only one ply 6A of cords arranged at an angle of from 75 to 90 degrees with respect to the tire circumferential direction. As the carcass cords, organic fiber cords, e.g. nylon, polyester, rayon and the like, can be suitably used. The carcass ply 6A extends between the bead portions 4 through the tread portion 2 and sidewall portions 3 and is turned up around the bead core 5 in each bead portion 4 from the axially inside to the outside of the tire to form a pair of turned up portions 6b and a main portion 6a therebetween.

The bead portions 4 are each provided between the turned up portion 6b and the main portion 6a with a bead apex rubber 8 extending radially outwardly from the bead core 5 in a tapered manner to reinforce the bead portion.

The belt 7 is made up of two cross plies 7A and 7B each made of cords laid at an angle of from 10 to 30 degrees with respect to the tire circumferential direction. Namely, the cords of the radially inner ply 7A cross the cords of the radially outer ply 7B.

Figure 2:
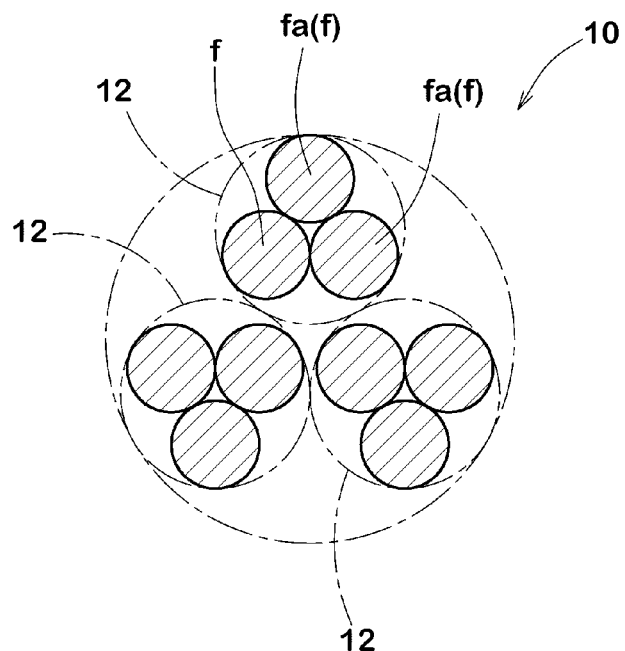
FIG. 2 is a schematic cross sectional view of a steel cord used as the belt cord.

As shown in FIG. 2, a steel cord 10 having a 3×3×0.17 cord structure is used as the cords of the plies 7A and 7B. The bending rigidity of the steel cord 10 is set in a range of from 10.0 to 12.0 g·cm.

The elongation L100 of the steel cord 10 at a tensile load of 100 N is set in a range of from 1.5% to 2.0%.

Thus, the steel cord 10 is provided with a lower bending rigidity and a larger elongation L100 when compared with the usual steel cords having 3×3×0.17 cord structures.

Therefore, although the relatively thin steel filaments (f) having the diameter of 0.17 mm are used, the cord 10 is provided with resistance to compression fatigue, and the required tire durability can be obtained.

Especially, by setting the bending rigidity at 10.0 g·cm or more, the handling stability can be improved.

By setting the bending rigidity at 12.0 g·cm or less, the belt preformed into a cylindrical shape can be transformed into a barrel shape during building the raw tire to accord with the highly curved tread profile. Thus, the formability of the raw tire can be improved.

If the bending rigidity becomes less than 10.0 g·cm, the belt rigidity becomes insufficient, and it becomes difficult to effectively improve the handling stability. If the bending rigidity becomes more than 12.0 g·cm, it becomes difficult to transform the cylindrical belt so as to accord with the highly curved tread profile. Thus, the formability is deteriorated.

Figure 4:
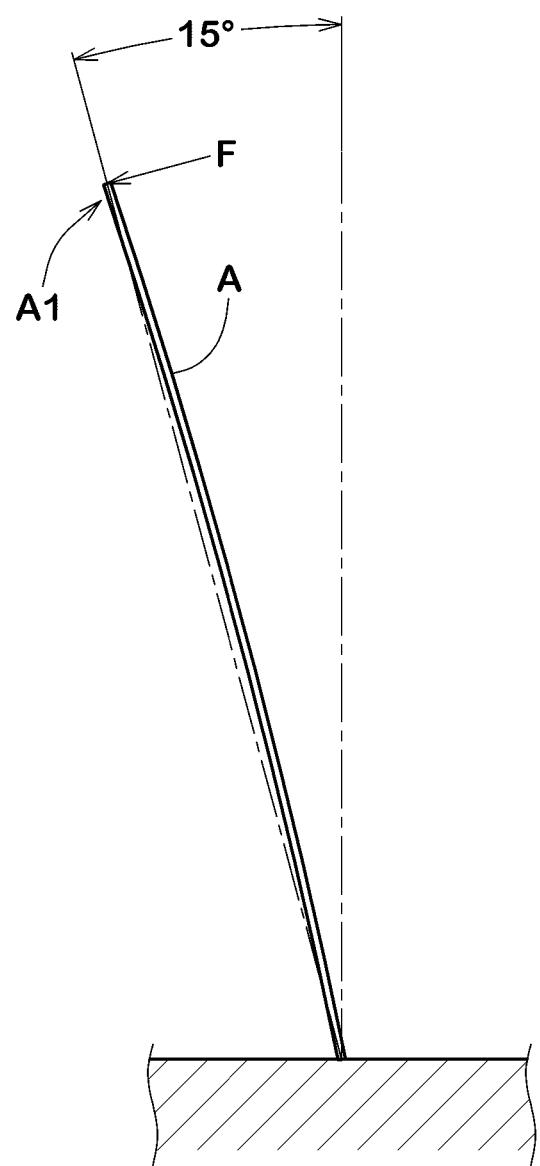
FIG. 4 is a diagram for explaining a method for measuring the bending rigidity of the steel cord.

The bending rigidity of the steel cord 10 is measured, using a specimen (A) of 70 mm length. The specimen is cut out from a long steel cord 10. In order to prevent untwisting, fusion cutting is utilized at both ends of the specimen. As schematically shown in FIG. 4, the specimen (A) is fixed to a support so that the length between the fixed end and the free end A1 becomes 50 mm. Then, a bending force F is applied to the free end A1, and the resistive force (stiffness) when the angle at the free end A1 becomes 15 degrees is measured as the bending rigidity. For example, Taber Stiffness Tester Model 150-D, CCSi, Inc. can be used to measure the bending rigidity.

Since the elongation L100 is not less than 1.5%, the steel cord 10 is provided with resistance to compression fatigue (durability), and further it is possible to improve the ride comfort.

By setting the elongation L100 at 2.0% or less, the tire strength and handling stability can be secured.

If the elongation L100 becomes less than 1.5%, the resistance to compression fatigue and tire durability are decreased, and further the ride comfort is deteriorated. If the elongation L100 becomes more than 2.0%, even when the bending rigidity of the cord is set in above-mentioned range, the belt 7 becomes deformable, and the tire strength is decreased. Further, the handling stability is deteriorated.

In order to set the bending rigidity and elongation L100 within the above-mentioned ranges, it is necessary to use a large number of shaped filaments (fa) in the steel cord 10 and to increase the twist number.

In a 3×3 structure, the number of the filaments is nine and numerous, and the number of twist becomes increased by the primary twist and the final twist, therefore, a 3×3 structure is essential in order to obtain the above-mentioned cord properties (bending rigidity and elongation L100).

Figure 3:
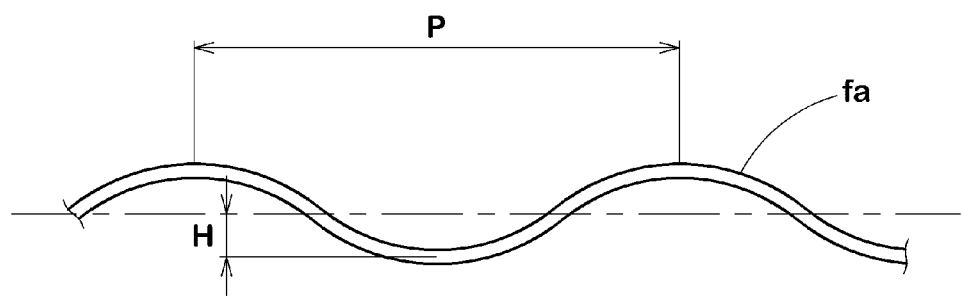
FIG. 3 is a side view of a shaped filament used in the steel cord.

As shown in FIG. 3, the shaped filament (fa) is a filament preshaped into a wavy form before twisted so as to preferably have a wave height H of 0.15 to 0.25 mm and a wave pitch P of 3.0 to 3.6 mm.

If the wave height H is more than 0.25 mm or the wave pitch P is less than 3.0 mm, there is a possibility that the filament is damaged during preshaping and the cord strength and the tire strength are decreased. If the wave height H is less than 0.15 mm or the wave pitch P is more than 3.6 mm, as the shaping is insufficient, it becomes difficult to obtain the bending rigidity and elongation L100 within the above-mentioned ranges.

In this example, two of the three steel filaments (f) of each of the three strands 12 are the shaped filaments (fa). The one remained steel filament is a non-shaped linear filament before twisted. Thus, the cord 1 includes six shaped filaments (fa). If all of the nine filaments are the shaped filaments (fa), the dimension or twist structure becomes unstable and the above-mentioned cord properties can not be obtained with high accuracy and stably. If each strand 12 includes only one shaped filament (fa), it becomes difficult to obtain the cord properties within the above-mentioned ranges.

In order to obtain the above-mentioned cord properties, the sum (N1+N2) of the primary twist number N1 and the final twist number N2 of the steel cord 10 is preferably set at at least 9 turns/10 cm.

If less than 9 turns/10 cm, in order to obtain the elongation L100 within the above-mentioned range, it becomes necessary to increase the wave height H and/or to decrease the wave pitch P. As a result, the filament is liable to be damaged during preshaping.

In this example, the primary twist number N1 is equal to the final twist number N2. But, the twist numbers N1 and N2 may be different from each other as far as the ratio N1/N2 is in a range of from 0.8 to 1.2.

As to the material of the steel filament (f), a high carbon steel having the chemical composition shown in Table 1 can be suitably used.

TABLE 1

| | |
|---|---|
| C | 0.67% to 0.75% |
| Mn | 0.40% to 0.60% |
| Si | at most 0.35% |
| P | at most 0.025% |
| S | at most 0.025% |
| Cu | at most 0.2% |
| Cr | at most 0.2% |

As to the topping rubber used in the belt plies 7A and 7B, for example a rubber composition shown in Table 2 is suitably used. But, the topping rubber is not limited to this composition. Various rubber compositions used as topping rubber for belt cords can be used in this invention.

TABLE 2

| | (phr) |
|---|---|
| NR | 65 |
| SBR | 35 |
| carbon | 140 |
| zinc oxide | 5 |
| stearic acid | 4 |
| antioxidizing agent | 1.3 |
| resin | 25 |
| sulfur | 5 |
| vulcanizing accelerator | 0.9 |

(2) Strength Test:

The tire strength at breakage was measured by pressing an iron rod onto the tread face of the test tire mounted on a wheel rim and inflated to 250 kPa. The results are indicated in Table 3 by an index based on Comparative example tire Ref.1 being 100, wherein the larger index number is better.

(3) Durability Test:

using a tire test drum, the test tire was run under the following conditions: speed 270 km/h, camber angle 0 degree, tire pressure 320 kPa, tire loaded 1.35 kN and temperature 25+/−5 degrees C., and the running distance until the tread portion was damaged was measured. The results are indicated in Table 3 by an index based on Comparative example tire Ref.1 being 100, wherein the larger index number is better.

(4) Formability Test:

with respect to each test tire, one hundred raw tires were manufactured and the number of defectives occurring when transforming the cylindrical belt was counted. The results are indicated in Table 3.

From the test results, it was confirmed that the tires according to the present invention can bring out excellent handling stability without sacrificing the ride comfort, formability and durability.

TABLE 3

| Tire steel belt cord | Ref. 1 | Ref. 2 | Ex. 1 | Ex. 2 | Ex. 3 | Ref. 3 | Ref. 4 | Ex. 4 | Ref. 5 | Ex. 7 | Ref. 8 | Ref. 9 | Ref. 10 | Ref. 11 |
|---|---|---|---|---|---|---|---|---|---|---|---|---|---|---|
| number of shaped filaments | 6 | 12 | 6 | 6 | 6 | 1 | 6 | 6 | 6 | 6 | 12 | 3 | 9 | 3 |
| wave height H (mm) | 0.15 | 0.1 | 0.15 | 0.15 | 0.25 | 0.25 | 0.1 | 0.25 | 0.15 | 0.25 | 0.1 | 0.26 | 0.3 | 0.15 |
| wave pitch P (mm) | 3 | 2.5 | 3.6 | 3.6 | 3.6 | 3.5 | 3 | 3.5 | 2.5 | 3.5 | 3 | 3.6 | 3.6 | 3.6 |
| twist number N1 + N2 | 9 | 10 | 9 | 9 | 9 | 10 | 7 | 9 | 9 | 9 | 9 | 9 | 8 | 10 |
| bending rigidity | 13.0 | 9.0 | 10.0 | 11.0 | 12.0 | 13.0 | 11.0 | 11.0 | 11.0 | 10.0 | 9.0 | 13.0 | 9.0 | 13.0 |
| elongation L100 (%) | 2.0 | 2.0 | 2.0 | 2.0 | 2.0 | 2.0 | 1.0 | 1.5 | 3.0 | 1.5 | 1.0 | 3.0 | 3.0 | 1.0 |
| handling stability | 7.5 | 7.0 | 8.0 | 9.5 | 10.0 | 8.0 | 9.0 | 8.5 | 7.0 | 8.0 | 4.0 | 8.0 | 3.0 | 10.0 |
| strength | 100 | 85 | 100 | 102 | 103 | 100 | 85 | 101 | 90 | 103 | 105 | 96 | 95 | 107 |
| durability | 100 | 102 | 103 | 102 | 100 | 90 | 80 | 100 | 105 | 101 | 102 | 95 | 102 | 98 |
| formability | 50 | 0 | 0 | 0 | 0 | 50 | 5 | 0 | 0 | 0 | 0 | 55 | 0 | 40 |

Comparison Tests

Motorcycle radial tires of size 160/60ZR17 (rim size MT4.50×17) having the internal structure shown in FIG. 1 including a belt composed of two-cross plies of belt cords having specifications shown in Table 1 were experimentally manufactured and tested for the ride comfort, handling stability, tire strength, tire durability and formability.

The tires had substantially same specifications except for those shown in Table 1.

The cord count in each belt ply was 37.5/50 mm.

The topping rubber used in each belt ply was the rubber composition shown in Table 2.

(1) Ride Comfort and Handling Stability Test:

The test tire (tire pressure 250 kPa) was installed on the rear wheel of a 1000 cc road sport motorcycle.

During running on a dry asphalt road of a tire test course, the ride comfort and the handling stability during cornering were evaluated by the test rider into ten ranks. Eight or higher ranks are acceptable. The results are indicated in Table 3.

The invention claimed is:

1. A radial tire for motorcycle comprising
a tread portion curved so that the maximum tire section width lies between tread edges, and
a belt disposed radially outside the carcass in the tread portion, and composed of two cross plies of steel cords, wherein
the steel cords in each of the two cross plies are laid at an angle of from 10 to 30 degrees with respect to the tire circumferential direction,
the steel cords each have a 3×3×0.17 cord structure in which three strands each made up of three steel filaments having a diameter of 0.17 mm and primary-twisted are final-twisted together,
a bending rigidity of each of the steel cords is 10.0 to 12.0 g·cm, and
an elongation L100 of each of the steel cords at a tensile load of 100 N is 1.5 to 2.0%.

2. The radial tire for motorcycle according to claim 1, wherein
two of the three steel filaments in each strand are shaped filaments preshaped into a wavy form before twisted.

3. The radial tire for motorcycle according to claim 2, wherein in said 3×3×0.17 cord structure, each of the three strands has a primary twist number N1, and the three strands have a final twist number N2, and the sum (N1+N2) of the primary twist number N1 and the final twist number N2 is at least 9 turns/10 cm.

4. The radial tire for motorcycle according to claim 3, wherein the sum (N1+N2) of the primary twist number N1 and the final twist number N2 is at most 10 turns/10 cm.

* * * * *